United States Patent

Bissell

[11] 4,085,591
[45] Apr. 25, 1978

[54] CONTINUOUS FLOW, EVAPORATIVE-TYPE THERMAL ENERGY RECOVERY APPARATUS AND METHOD FOR THERMAL ENERGY RECOVERY

[76] Inventor: Lawrence E. Bissell, 1242 26th St., Apt. B, Santa Monica, Calif. 90404

[21] Appl. No.: 615,931

[22] Filed: Sep. 23, 1975

[51] Int. Cl.² .................................. F01K 21/04
[52] U.S. Cl. ........................................... 60/674
[58] Field of Search .................... 60/682, 649, 674

[56] References Cited

U.S. PATENT DOCUMENTS

| 433,055 | 7/1890 | Tellier | 60/649 X |
|---|---|---|---|
| 583,240 | 5/1897 | Thomine | 60/674 |
| 770,468 | 9/1904 | Lake | 60/674 |
| 2,706,890 | 4/1955 | Schmidt | 60/649 |
| 2,969,637 | 1/1961 | Rowekamp | 60/641 |
| 3,101,592 | 8/1963 | Robertson et al. | 60/649 UX |
| 3,505,810 | 4/1970 | Mamiya | 60/649 X |
| 3,861,151 | 1/1975 | Hosokawa | 60/649 |
| 3,972,195 | 8/1976 | Hays | 60/649 |

*Primary Examiner*—Allen M. Ostrager
*Attorney, Agent, or Firm*—Henry M. Bissell

[57] ABSTRACT

A continuous flow, evaporative-type thermal energy recovery apparatus comprises an evaporator unit to which are supplied continuous pressurized flows of hot water and air, and in which a portion of the hot water is evaporated into the air, preferably to completely saturate the air with moisture. Connected to receive the resulting flow of pressurized, water saturated air from the evaporator unit is a low pressure gas turbine, which is operated by such flow. Work is performed by expansion of the saturated air in the turbine, the work being converted, for example, to electricity by a generator connected in driven relationship with the turbine. The source of hot water may be a cooling system for cooling other apparatus or may, for instance, be a heat exchanger in which solar energy is used to heat water recirculated through the apparatus. Condensed water vapor from the turbine may also be recirculated. Water and air are supplied to the evaporator unit by pumps at a pressure substantially equal to the pressure of the saturated air in the unit, such pressure varying according to the equilibrium temperature thereof. The temperature of the water is maintained below the boiling point to avoid production of steam and to enable use of comparatively inexpensive system components having low temperature and pressure capabilities. A corresponding method of thermal energy recovery is thereby provided.

17 Claims, 4 Drawing Figures

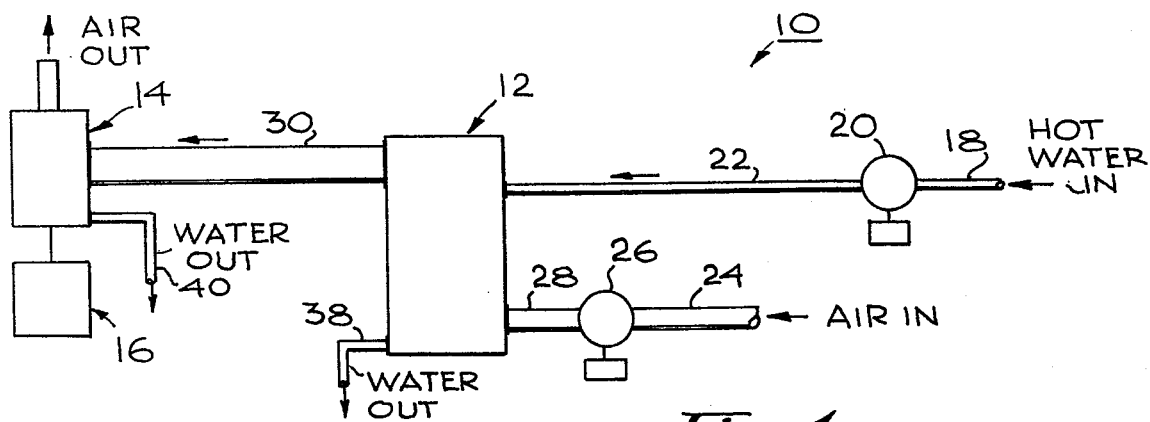
Fig. 1
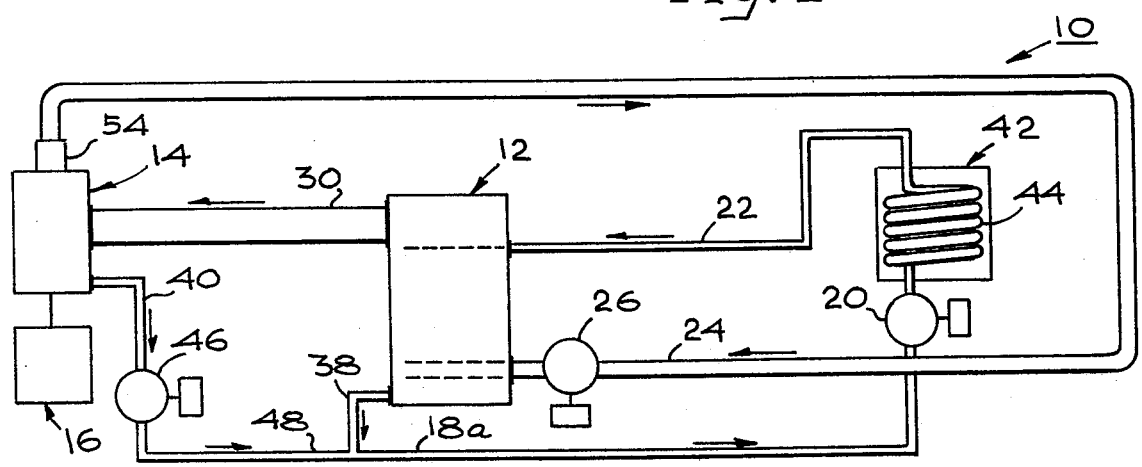
Fig. 2
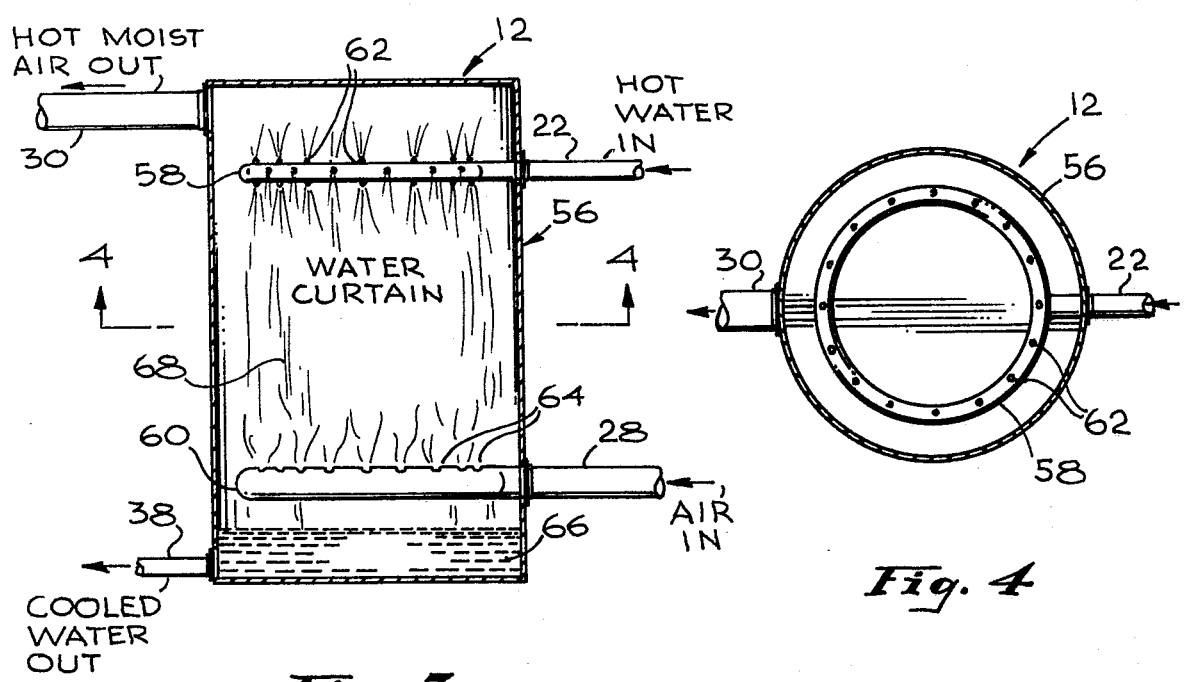
Fig. 3
Fig. 4

CONTINUOUS FLOW, EVAPORATIVE-TYPE THERMAL ENERGY RECOVERY APPARATUS AND METHOD FOR THERMAL ENERGY RECOVERY

BACKGROUND OF THE INVENTION

1. Field of the Invention

The field of the invention relates to apparatus employing thermal energy for the production of work, power and the like, and, more particularly, to such apparatus adapted for recovering thermal energy from hot fluids, the sun, etc.

2. Description of the Prior Art

Large amounts of energy in the form of heat are wasted in many heat producing operations. For example, a steam-electric generating plant may waste much of the heat generated in the condensation of steam back into water for the boilers and much of the heat generated in nuclear reactor power plants is usually lost to the cooling water used to maintain the reactors at a safe operating temperature. Not only is the energy associated with such heat lost when the heat is dissipated into the air or when heated cooling water is discharged into rivers, etc, but the resulting thermal pollution is often a substantial problem and the subject of much environmental concern.

Often the thermal energy desired to be recovered is of relatively low quality because it is in the form of water (or other fluid) at a temperature less than the boiling point of water. Conventional means alone are, therefore, generally not adaptable for recovery of the thermal energy. In an attempt to recover some of the thermal energy contained in waste hot water, Sautter (U.S. Pat. No. 924,838) discloses apparatus for using part of the heat energy in the water to convert portions of the hot water into steam used to operate a steam turbine.

Substantial disadvantages are, however, associated with the use of steam systems: High pressure vessels must be provided to contain the steam and the materials used in components of the system must also be capable of withstanding high steam temperatures. Therefore, to construct and maintain such steam systems is comparatively expensive and may not be economically feasible. Similar problems are also associated with proposals for utilizing solar energy to convert, by means of reflectors, condensers, etc., water into steam and using the steam to drive steam turbines and generate electricity.

As a consequence, it is often preferable and economically more feasible to employ lower temperatures and pressures in non-steam operated thermal energy recovery apparatus, which may be constructed from comparatively inexpensive materials. This may be particularly the case when the temperature of the source fluid is low compared to steam temperatures and in applications requiring minimum attendance and maintenance.

SUMMARY OF THE INVENTION

An evaporative-type thermal recovery apparatus, in accordance with the invention, comprises a source of volatile liquid, a source of gaseous fluid, evaporator means connected to the liquid and gaseous fluid sources for causing evaporation of a portion of the liquid into the gaseous fluid and a prime mover connected to the evaporator means for receiving gaseous fluid and evaporated liquid therefrom and operative thereby for the production of work, electrical energy or the like.

More specifically, the volatile liquid comprises water and the gaseous fluid comprises air. The temperature of the water supplied to the evaporator means is substantially above the ambient temperature but below the boiling point. The water is heated to such temperature if it is not heated when received. The means for heating the water may comprise a heat exchanger adapted for using solar heat.

The evaporator means comprises a vessel having disposed therein a spraying element through which water is continuously sprayed into the tank and an air outlet element through which air is continuously injected into the tank. These elements provide intermixing of the air and water in the tank and enhance evaporation of the water into the air. Water and air are supplied at a pressure substantially equal to the saturation pressure of air at the equilibrium temperature within the evaporator unit, and the flow rates are adjusted to provide substantially saturated air in the evaporator unit.

Means are provided for recirculating non-evaporated water from the evaporator unit and condensed water vapor from the prime mover through the evaporator unit and heater. Air may be recirculated from the prime mover back through the evaporator.

The prime mover may comprise a low pressure gas tubine, for being driven by the expanding saturated air. Since at elevated temperatures the specific volume of saturated air, per pound of dry air, is large compared to the specific volume of dry air alone, additional expansion, over what would be available were dry air alone used, occurs in the turbine and additional energy recovery is provided.

The apparatus is particularly adaptable for recovering thermal energy from already heated water received from cooling systems of other apparatus such as electrical equipment or nuclear power reactors, and is also adaptable to converting solar energy into useful work, by using the sun to heat water recirculated through the apparatus.

A corresponding method for recovery of thermal energy is thereby provided.

Because water at less than its boiling point is utilized and because the pressures associated with saturated air at temperatures below the boiling point of water are comparatively low, components of the apparatus may be constructed of comparatively inexpensive materials having low temperature and pressure capabilities.

BRIEF DESCRIPTION OF THE DRAWING

A better understanding of the present invention may be had from a consideration of the following detailed description, taken in conjunction with the accompanying drawing in which:

FIG. 1 is a schematic drawing of an evaporative-type thermal energy recovery apparatus, showing an evaporator unit and a turbine;

FIG. 2 is a schematic drawing of the evaporative-type thermal recovery apparatus, showing recirculation of water through a heat exchanger and showing recirculation of air;

FIG. 3 is a vertical sectional view of the evaporator unit, showing internal construction; and FIG. 4 is a horizontal sectional view taken along line 4—4 of FIG. 3, showing other features of the evaporator unit.

DESCRIPTION OF THE PREFERRED EMBODIMENT

As seen in FIG. 1, a thermal energy recovery apparatus 10 for utilizing heat from a liquid to do work or generate power, comprises generally an evaporator unit 12 and a low pressure gas turbine or other prime mover 14 to which may be connected in driven relationship, for example, a conventional electrical power generator 16.

Hot water is continuously supplied to the evaporator unit 12 from any available source, not shown, which may, for instance, be an outlet portion of a heat exchanger system in which the water is used to cool an electrical apparatus or receive heat from another cooling fluid. A fluid line 18 directs hot water from the source to a motor driven pump or other flow control unit 20, and from there through a fluid line 22 to an upper portion of the evaporator unit 12. Heat may also be added by other means.

Air, which may be at ambient temperature, is continuously supplied to a lower portion of the evaporator unit 12, from an appropriate source which may be the atmosphere, through an air line 24, an electrically operated air pump 26 and another air line 28. From an upper region of the evaporator unit 12, air, which is heated and which contains evaporated water, as more particularly described below, is directed to an inlet portion of the turbine 14 through an outlet air line 30.

A first fluid outlet or drain line 38 is provided at a lower region of the evaporator unit 12, to drain water therefrom, and a second fluid outlet or drain line 40 is provided from the turbine 14, to drain condensed moisture therefrom. The drain lines 38 and 40 may be routed to any convenient discharging area.

As exemplified in FIG. 2, the hot water source may comprise a solar heat exchanger 42 of generally conventional design and which may include a plurality of tube coils 44. The heat exchanger is disposed in the line 22 between the pump 20 and the evaporator unit 12. To provide a closed water recirculation system, the first drain line 38 from the evaporator unit 12 is connected to an inlet line 18a leading to the pump 20 and the second drain line 40 from the turbine 14 is connected to a second, electrically operated water pump 46, the outlet of which is connected, by a line 48, to the line 18a.

A closed air recirculation system may also be provided by connecting an air outlet 54 of the turbine 14 to the air inlet line 24 leading to the pump 26.

The evaporator unit 12, as more particularly seen in FIGS. 3 and 4, comprises a comparatively large, cylindrical tank 56, having disposed in an inside region a water spray unit 58 and an air inlet unit 60. A plurality of water spray nozzles or orifices 62 are formed along the water spray unit 58, which may comprise a ring (as shown in FIG. 4) or an elongate tube disposed towards the top of the evaporator unit 12. The nozzles 62 may be directed to spray the water entering the evaporator unit 12 in all directions or to spray it generally downwardly only. A plurality of air discharge orifices 64, formed in the air inlet unit 60, are preferably directed generally upwardly toward the fluid spray unit 58. The air inlet unit 60 is disposed near the bottom of the tank 56, but above a level 66 of water in the bottom of the tank. The fluid drain line 38 is connected to the tank 56 below the water level 66. The air outlet line 30 is connected to a top side region of the tank 56 above the fluid spray unit 58.

OPERATION

Hot pressurized water is introduced into the evaporator unit tank 56 through the inlet line 22, for example, by the pump 20, and is then ejected through the spray nozzles 62 of the water spray unit 58 to form a "water curtain" 68 throughout the tank, major portions of the water falling to the bottom of the tank and maintaining the water level 66. Pressurized air at an ambient temperature is introduced into the tank 56 through the air inlet line 28 by the air pump 26 and is then ejected through the orifices 64 of the air inlet unit 60 to flow upwardly through the water curtain 68 and out of the tank 56 through the air outlet line 30.

It is well known that at least part of the water in a closed container will evaporate into the above air to saturate the air. As a result of such water evaporation, pressure in the container will be increased, a particular increase in pressure being associated with each different equilibrium temperature of air and water in the container. For example, if the air and water are at an equilibrium temperature of 212° F., pressure in the container will be increased above ambient pressure by one atmosphere. At lower equilibrium temperatures, the pressure increase will be less. Such an increase in pressure is a result of the partial pressure of the evaporated water in the air. When the saturated air at the increased container pressure is released to the atmosphere, work may be accomplished by the expansion thereof.

The water, at a temperature of, for example, about 200° F., is introduced into the tank 56 at a pressure equal to the equilibrium pressure in the tank. Air, for example, at about 70° F., is introduced into the tank 56, by the pump 26, also at the equilibrium pressure. Within the tank 56, the incoming air flowing from the orifices 64 through the finely dispersed water in the water curtain 58 accelerates evaporation of the incoming hot water. Saturated air at an elevated equilibrium temperature, depending on the inlet temperatures of the water and air and on the mass flow rate of each (according to well known thermodynamic principles) is directed from the evaporator unit 12 through the outlet line 30 to the turbine 14. Within the turbine 14, the heated and pressurized saturated air from the line 30 expands to atmospheric pressure, thereby giving up its energy and causing rotation of inner portions of the turbine 14. Turning of these portions of the turbine 14 can be used to generate electrical power by means of the connected power generator 16.

The flow rate of hot water and air into the evaporator unit 12 are adjusted, according to the temperatures of the water and air and the volume of the tank 56, so that the air flowing through the evaporator unit is completely saturated at the equilibrium temperature. Such water and air flow adjustment may be, for example, by manual operation of valves or flow restrictors (not shown) in the lines 22 and 28 or by electrically controlling the speed of the pumps 20 and 26.

The non-evaporated water, having much of its heat transferred to the air in the evaporator unit 12, leaves the tank 56 via the drain line 38 and may be recirculated, as above described, through the line 18a and the pump 20, back through the heat exchanger 42, and thence back into the evaporator unit 12 through the line 22. To avoid loss of the water which condenses from the air as the saturated air passes through the turbine 14, the condensed water is directed back to the pump 20 through the lines 40 and 48, via the pump 46. Water vapor in the turbine exhaust may be condensed in conventional fashion, if desired, with the condensed water being returned through the pump 46 as indicated.

It is emphasized increased efficiency is achieved by use of the hot, pressurized and saturated air to operate the turbine 14 over that which would be expected by using hot, pressurized, dry air, such as might be obtained by flowing the air and water through a conventional heat exchanger rather than through the evaporator unit 12. The increased efficiency is a result of the specific volume of saturated air, per pound of dry air and at an elevated temperature, being substantially greater than the specific volume of dry air at the same elevated temperature. Since more air expansion is achieved in the turbine 14 by use of saturated air than by the use of dry air, more power is obtained from the turbine. Because of this increased efficiency, heat energy may be more effectively recovered from the water.

In additon, by utilizing water having a temperature below the boiling point—that is by utilizing a hot saturated air system rather than a steam system—use of high pressure vessels as are required for steam systems is avoided, the pressure actually involved being less than about 25–30 psi. Also, all components of the apparatus 10 operates at temperatures below about 200° F.; therefore, inexpensive materials such as plastics, having comparatively low temperature capabilities may be employed.

Although the apparatus 10 has been described as utilizing hot water and air, it may also be used with other liquids and gases, the primary consideration being that the fluid used be volatile in the gas used, so that some of the liquid be evaporated to saturate the gas. This is in contrast to other systems which may require a non-volatile liquid by means of which a gas is heated. And although it is preferable that if water is used as the liquid, its temperature be close to the boiling point, the apparatus 10 will operate at lesser water temperatures. In addition, although it is preferable for optimum results to saturate the air or other gaseous fluid, lesser benefits can still be obtained when the air, etc. is not completely saturated.

In the manner described and illustrated, waste heat already contained in liquids such as water or heat economically transferred to water from the sun, is employed to operate a low pressure gas turbine and cause performance of work or generation of power thereby. A corresponding method of thermal energy recovery is thereby provided.

Although there has been described above a specific arrangement of an evaporative-type thermal energy recovery apparatus in accordance with the invention for the purpose of illustrating the manner in which the invention may be used to advantage it will be appreciated that the invention is not limited thereto. Accordingly, any and all modifications, variation or equivalent arrangements which may occur to those skilled in the art should be considered to be within the scope of the invention as defined in the appended claims.

What is claimed is:

1. An evaporative-type thermal energy recovery apparatus, which comprises:
  a. a source of volatile liquid,
  b. a source of gaseous fluid,
  c. evaporator means including a mixing chamber connected to said liquid and gaseous fluid sources for causing evaporation within said chamber of at least a portion of liquid from said liquid source into gaseous fluid from said gaseous fluid source, said mixing chamber including a first elongated pipe extending transversely of the chamber in the upper portion thereof, said pipe being connected to said liquid source and having a series of perforations located about the pipe and along its length inside the chamber for releasing liquid within the chamber, and a second pipe extending transversely of the chamber within a lower portion thereof, said second pipe being connected to the gaseous fluid source and having a series of enlarged openings along the upper side of said second pipe within the mixing chamber for releasing said gaseous fluid into contact with liquid dropping from the first pipe perforations, and
  d. a prime mover connected to said evaporator means for receiving gaseous fluid and evaporated liquid therefrom and being operative thereby for the production of work, electrical energy or the like.

2. The apparatus according to claim 1, wherein said volatile liquid comprises water and wherein said gaseous fluid comprises air.

3. The apparatus according to claim 2, wherein the temperature of said water is substantially above ambient temperature.

4. The apparatus according to claim 2 including means for heating said water to a temperature substantially above the ambient temperature.

5. The apparatus according to claim 4, wherein said heating means includes means adapted for receiving heat from the sun.

6. The apparatus according to claim 2, including flow adjusting means associated with said water and air sources and cooperating with said evaporator means for causing air passing through said evaporator means to receive a predetermined degree of saturation by water evaporated therein.

7. The apparatus according to claim 1, including means for recirculating non-evaporated liquid from said evaporator means back to said liquid source.

8. The apparatus according to claim 7, including means for recirculating condensed vapors of said liquid from said prime mover back to said liquid source.

9. The apparatus according to claim 1, including means for recirculating gaseous fluid from said prime mover back to said gaseous fluid source.

10. The apparatus according to claim 1, wherein said prime mover includes a low pressure gas turbine.

11. A continuous flow, evaporator-type thermal energy recovery apparatus, which comprises:
  a. evaporator means for evaporating water into air, said evaporator means including a tank having disposed therewithin at an upper region a water spraying unit and an air inlet unit disposed therewithin at a lower region thereof, and having an air outlet line and a water outlet line, the water spraying unit comprising a pipe extending transversely of the tank in the upper region thereof and having a series of perforations located generally about the circumference of the pipe and along its extent within the tank, the air inlet unit comprising a second pipe extending transversely of the tank underneath and generally in line with said first pipe and having a series of openings along the upper side thereof, b. means for supplying pressurized hot water to said evaporator water spraying unit in a continuous manner.

c. means for supplying pressurized air to said evaporator water spraying unit in a continuous manner, and d. a turbine connected for receiving air and evaporated water from said air outlet of said evaporator means and being operative by expansion thereof to perform work.

12. The apparatus according to claim 11, including means for controlling the flow of pressurized hot water and pressurized air into, respectively, said water spraying unit and said air inlet unit to cause air passing through said evaporator means to become saturated to a predetermined degree by water sprayed through said evaporator means.

13. The apparatus according to claim 12, wherein said flow control means comprise a water pump and an air pump.

14. The apparatus as claimed in claim 11, wherein said means for supplying pressurized hot water includes means adapted for heating the water by solar energy.

15. The apparatus according to claim 14, including water recirculating means for returning non-evaporated water from the evaporator means to the water heating means for reheating.

16. The apparatus according to claim 15, wherein said recirculating means includes means for recirculating condensed water from said turbine back to said water heating means.

17. The apparatus according to claim 11, including air recirculating means for returning air from said turbine to said means for supplying air.

* * * * *

UNITED STATES PATENT OFFICE
CERTIFICATE OF CORRECTION

Patent No. 4,085,591           Dated   April 25, 1978

Inventor(s)   Lawrence E. Bissell

It is certified that error appears in the above-identified patent and that said Letters Patent are hereby corrected as shown below:

The drawing figure on the cover sheet should be deleted to insert the following drawing figure:

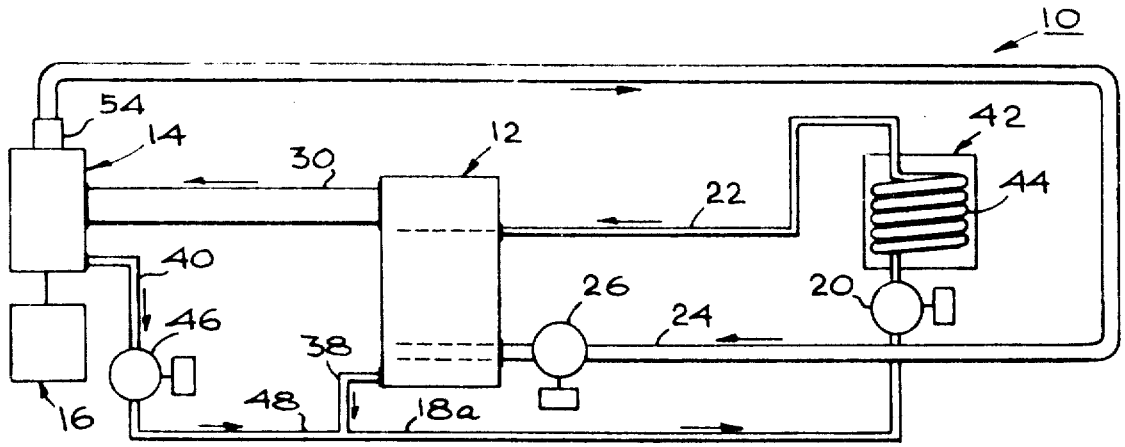

Signed and Sealed this

Twelfth Day of June 1979

[SEAL]

Attest:

RUTH C. MASON
Attesting Officer

DONALD W. BANNER
Commissioner of Patents and Trademarks